United States Patent [19]

Condon

[11] Patent Number: 5,236,158

[45] Date of Patent: *Aug. 17, 1993

[54] PIPE HANGING CLAMP

[76] Inventor: Duane R. Condon, 2330 Raymond Ave., Ramona, Calif. 92065

[*] Notice: The portion of the term of this patent subsequent to Oct. 13, 2009 has been disclaimed.

[21] Appl. No.: 958,251

[22] Filed: Oct. 8, 1992

Related U.S. Application Data

[63] Continuation of Ser. No. 796,774, Nov. 25, 1991, Pat. No. 5,154,375.

[51] Int. Cl.$^5$ .............................................. F16L 3/08
[52] U.S. Cl. ................................... 248/73; 248/74.1; 248/62; 248/57
[58] Field of Search ............... 248/73, 71, 74.1, 74.2, 248/74.3, 56, 57, 62

[56] References Cited

U.S. PATENT DOCUMENTS

| | | | |
|---|---|---|---|
| 4,930,733 | 6/1990 | Logsdon | 248/74.2 X |
| 4,941,630 | 7/1990 | Albano | 248/71 |
| 5,024,405 | 6/1991 | McGuire | 248/74.1 X |

FOREIGN PATENT DOCUMENTS

| | | | |
|---|---|---|---|
| 2521652 | 8/1983 | France | 248/74.1 |
| 411403 | 6/1934 | United Kingdom | 248/74.1 |

Primary Examiner—Alvin C. Chin-Shue
Attorney, Agent, or Firm—Baker, Maxham, Jester & Meador

[57] ABSTRACT

A pipe hanging clamp comprises a central clamp portion and first and second mounting platforms which extend from opposite sides thereof. The clamp portion has a hole for receiving a pipe therethrough, and a gap therein for allowing the clamp portion to be cinched around the pipe. A first mounting platform has a first flange for engaging and extending over a side edge of a mounting strap such as a HYCO (trademark) strap. A mounting peg extends from the first platform for engaging a hole in the mounting strap. A second mounting platform has a second flange for also engaging and extending over the side edge of the strap. The configuration of the platforms and clamp portion is selected so that the pipe will be cinched inside the clamp portion when the mounting peg is inserted in the hole in the strap and the clamp rotated so that the two flanges are engaged over the side edge of the strap. The clamp is preferably made of injection molded plastic and the configuration of the platforms and the clamp portion are such that they are deformed and provide a spring force that pushes the flanges against the side edge of the strap.

8 Claims, 2 Drawing Sheets

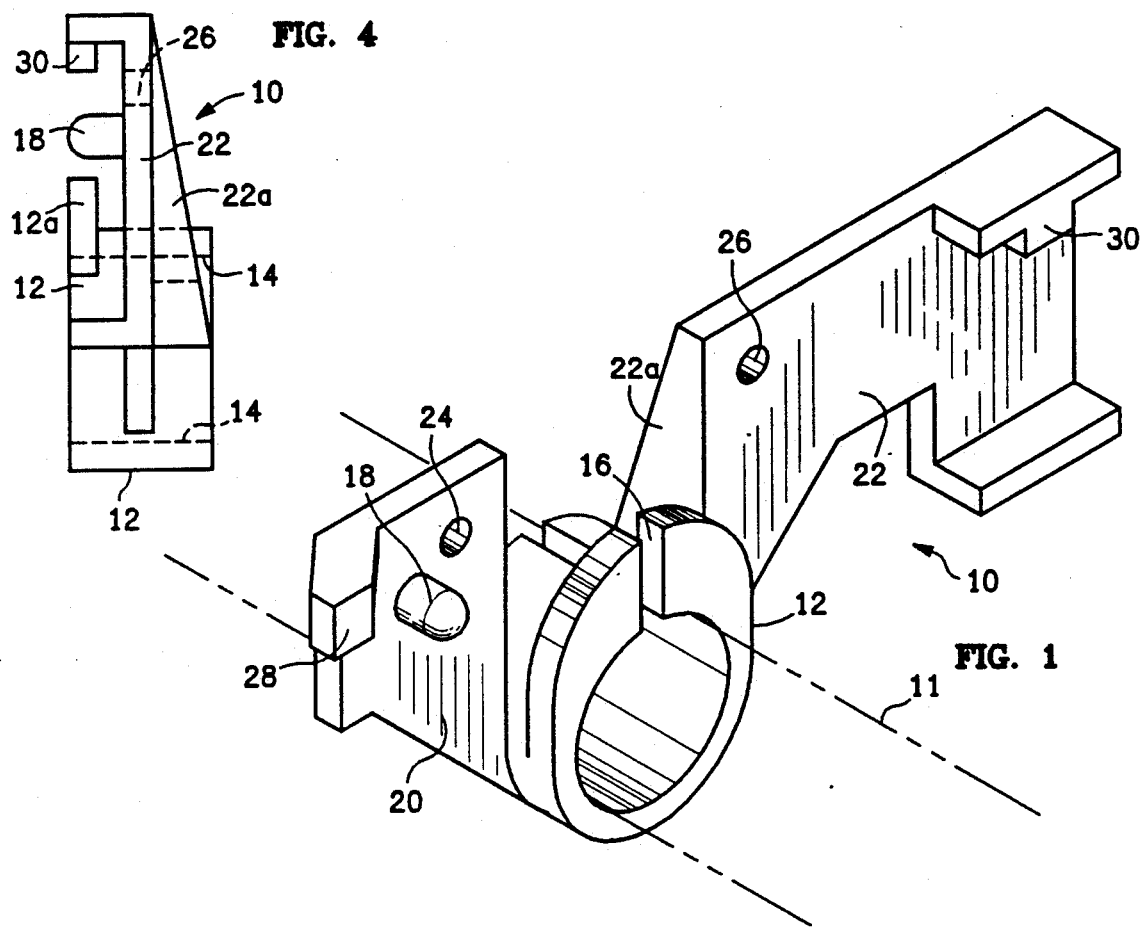
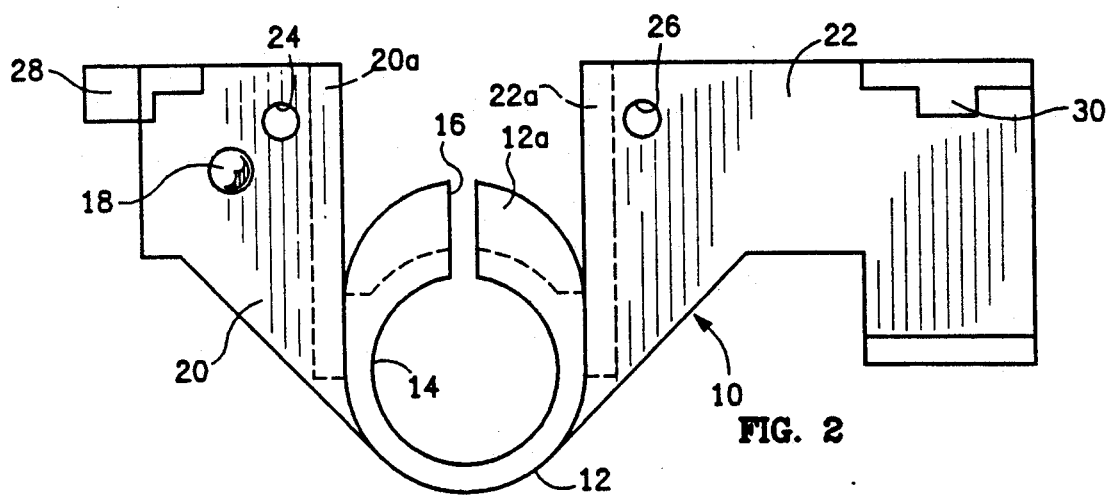
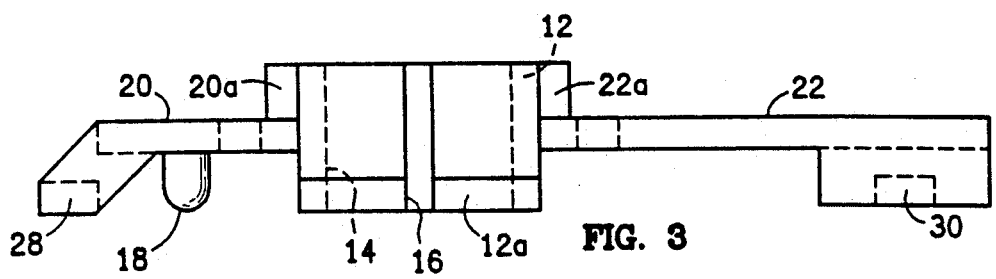

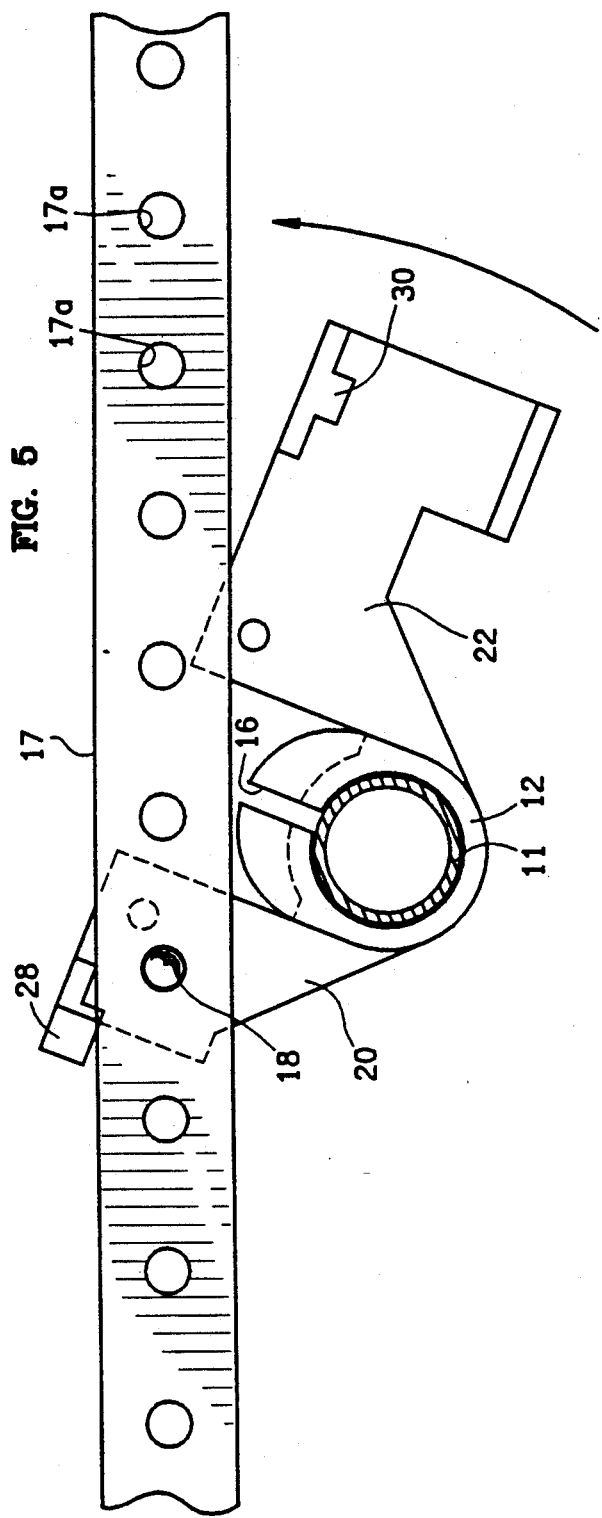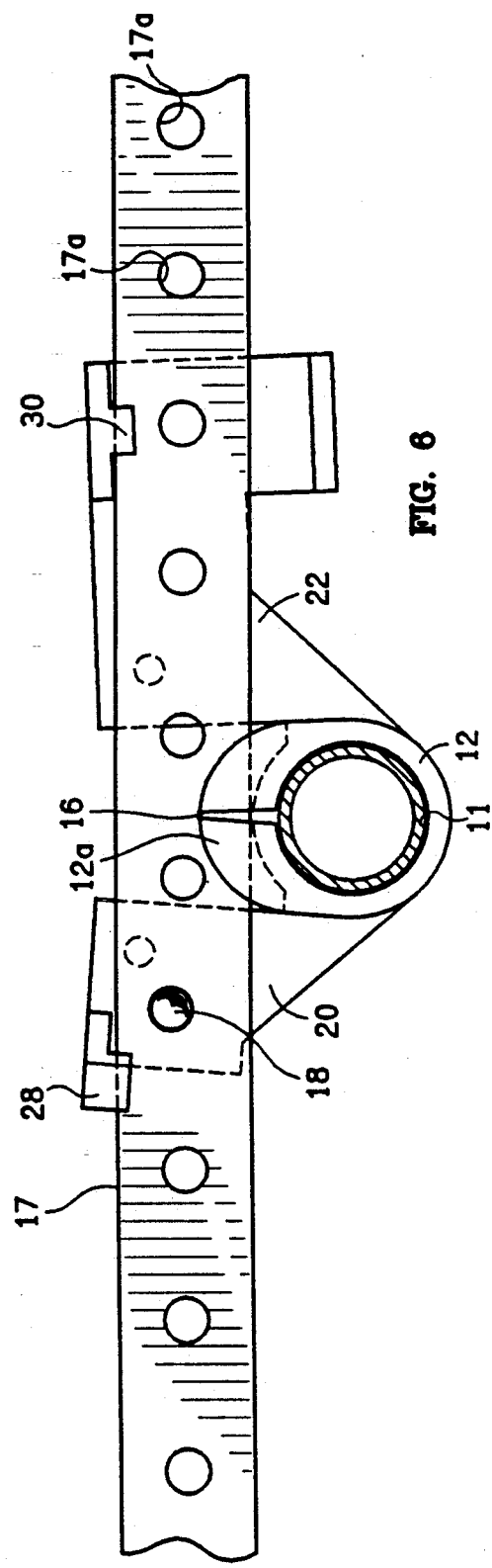

PIPE HANGING CLAMP

CROSS-REFERENCE TO RELATED APPLICATION

This application is a continuation of U.S. patent application Ser. No. 07/796,774, filed Nov. 25, 1991, U.S. Pat. No. 5,154,373, issued Oct. 13, 1992.

BACKGROUND OF THE INVENTION

The present invention relates to building construction, and more particularly to plumbing fixtures used to mount water pipe to studs or joists.

Copper water pipe should not be supported over long distances by extending through holes drilled in studs. Such holes are time consuming to drill and weaken the strength of the stud. Also, water hammer in the pipe can cause the pipe to move in the studs since the holes are typically larger than the outside diameter of the pipe.

A large number of pipe hanging clamps have been developed in the past for supporting thin walled copper water pipe in building constructions. These clamps need to accommodate thermal expansion of the copper pipe. The clamps should not be made of dissimilar metal since galvanic action can cause corrosion. Copper pipe straps are relatively expensive and must normally be nailed to studs.

The following is a list of U.S. Pat. Nos. showing various clamps and hangers in this field:
2,216,886—Titled: Holder—Langelier
2,992,800—Titled: Pipe Hanger—Madson
3,503,580—Titled: Universal Conduit Support Bracket—Levy
3,684,223—Titled: Pipe Clamp—Logsdon
4,369,945—Titled: Cable Clamps—Mantoan et al.
4,379,537—Titled: Cable Hanger—Perrault et al.
4,714,218—Titled: Hanger for Pipe Clamp—Hungerford, Jr.

More recently it has been common to surround the pipe with clamps hung on straps nailed between studs. Strap material of this type is widely used and is sold under the trademark HYCO. It has holes punched in the center at regular intervals.

Of the foregoing patented devices, the pipe clamp of U.S. Pat. No. 3,684,223 of Logsdon has been widely used by plumbers. However, it must either be nailed to a stud or secured with screws or bolts to a HYCO strap, which adds time and cost to the plumbing installation.

The CINCH CLAMP trade mark plastic pipe hanging clamp recently introduced by CAL PAC WEST has a central peg and two other pegs on either side of the central peg. See U.S. Pat. No. 5,024,405 of McGuire granted Jun. 18, 1991. This device can be rotated into engagement with corresponding holes in a HYCO strap. The principal drawback of this device is that the holes in the HYCO strap are not precision drilled and the pegs are not precisely located on the clamp due to tolerance variations in the injection molding. Therefore it is sometimes difficult, if not impossible, to align the pegs with a pair of holes in the HYCO strap. Also, removal of this device from the HYCO strap once it has been snapped into place is very difficult. This makes it hard to re-mount the clamp if the plumber misjudges the initial location for the pipe mounting.

SUMMARY OF THE INVENTION

It is therefore the primary object of the present invention to provide an improved pipe hanging clamp.

According to the present invention a pipe hanging clamp comprises a central clamp portion and first and second mounting platforms which extend from opposite sides thereof. The clamp portion has a hole for receiving a pipe therethrough, and a gap therein for allowing the clamp portion to be cinched around the pipe. The first mounting platform has a first flange for engaging and extending over a side edge of a HYCO mounting strap and a mounting peg for engaging a hole in the mounting strap. The second mounting platform has a second flange for also engaging and extending over the side edge of the strap. The configuration of the platforms and clamp portion is selected so that the pipe will be cinched inside the clamp portion when the mounting peg is inserted in the hole in the strap and rotated so that the two flanges are engaged over the side edge of the strap. The clamp is preferably made of injection molded plastic and the configuration of the platforms and the clamp portion are such that they are deformed and provide a spring force that pushes the flanges against the side edge of the strap.

BRIEF DESCRIPTION OF THE DRAWINGS

FIG. 1 is a perspective view of a preferred embodiment of my pipe hanging clamp showing a water pipe extending therethrough in phantom lines.

FIG. 2 is a front elevation view of the preferred embodiment of my pipe hanging clamp.

FIG. 3 is a view of the upper edge of the preferred embodiment of my pipe hanging clamp taken from the top of FIG. 2.

FIG. 4 is a view of the end edge of the preferred embodiment of my pipe hanging clamp taken from the right side of FIG. 2.

FIG. 5 is a reduced view of the preferred embodiment of my pipe hanging clamp illustrating an initial step in attaching the same on a mounting strap after a pipe has been inserted through the clamp.

FIG. 6 is a view similar to FIG. 5 illustrating the final alignment of the preferred embodiment of my pipe hanging clamp after it has been fully attached to the mounting strap. The deformations of the clamp in this view are exaggerated to better convey the spring action that firmly holds the clamp in place.

DESCRIPTION OF THE PREFERRED EMBODIMENT

A preferred embodiment of my pipe hanging clamp 10 is illustrated in the perspective view of FIG. 1. The clamp is used in constructing homes and, in particular, in mounting a copper water pipe 11 so that it is supported between studs or joists (not illustrated). The clamp has a generally cylindrical clamp portion 12 with a generally cylindrical wall a hole 14 (FIG. 2) through which copper pipe may be inserted. There is a slit or gap 16 in the clamp portion wall which allows it to expand to receive a pipe and cinch around the copper pipe. The clamp is hung on HYCO strap 17 (FIG. 5) which has holes 17a punched in the center at regular intervals.

Referring to FIGS. 3 and 4, a mounting peg 18 extends from a first generally planar mounting platform 20 (FIG. 2) that extends from the clamp portion 12. A second generally planar mounting platform 22 extends from the other side of the clamp portion 12. The second mounting platform does not have a mounting peg. The platforms have tapered support beams 20a and 20a that extend normal to the main portions thereof adjacent the clamp portion 12 to enhance strength. Holes 24 and 26 are provided in the mounting platforms 20 and 22, respectively. They permit the clamp to be nailed to a stud in lieu of attaching it to a HYCO strap. Screws or other fasteners could also be used.

Referring to FIG. 5, the mounting peg 18 is inserted in a selected hole 17a in the strap 17 at the appropriate location. In order to accomplish this, the mounting platforms 20 and 22 of the clamp must extend at an angle with respect to the strap 17. The copper pipe 11 is inserted through the hole 14 and the clamp portion 12 before mounting peg 18 is inserted into the selected hole in the strap 17. This fixes the longitudinal position of the clamp on the strap. Once this is accomplished, the platforms 20 and 22 are rotated counter-clockwise as indicated by the arrow in FIG. 5 until they are in alignment and generally parallel with the strap 17 as shown in FIG. 6. This causes an L-shaped flange 28, which extends from mounting platform 20, to engage the top edge of the strap 17. Another L-shaped flange 30 which extends from the other mounting platform 22 also snaps over the top edge of the strap 17. This causes the gap 16 to become smaller, cinching the clamp portion 12 around the copper pipe 11. Because the clamp is slightly deformed, its spring force causes the L-shaped flange 30 to push down hard against the top edge of the strap to hold the pipe hanging clamp and the pipe firmly in position. The platform 22 is preferably longer than the platform 20 to provide leverage. Extensions 12a of the clamp portion can eventually abut one another to prevent over-sqeezing.

Preferably the illustrated embodiment of my pipe hanging clamp is molded of suitable plastic such as polyethylene, ABS, PVC, or polypropylene. It is preferably injection molded as a one-piece (unitary) body. After attachment, it can easily be removed from the strap by pulling flange 30 up and away from the strap, rotating the device clockwise, and pulling peg 18 and flange 28 away from the strap.

While I have described a preferred embodiment of my pipe hanging clamp, it should be understood that modifications and adaptations thereof will occur to persons skilled in the art. Therefore, the protection afforded my invention should only be limited in accordance with the scope of the following claims.

I claim:

1. An easily removable pipe hanging clamp, comprising:
    a plastic clamp portion having a generally cylindrical wall defining a hole for receiving a pipe therethrough, and a gap therein for allowing the clamp portion to be cinched around the pipe;
    a first plastic mounting platform extending in a plane from a first side of the clamp portion and having a first flange for engaging and extending over a first side edge of a mounting strap;
    a second plastic mounting platform extending in said plane from a second side of the clamp portion and having a second flange for engaging and extending over the first side edge of the strap;
    the clamp portion and the platforms being formed as a unitary body and connected so that the pipe extends generally perpendicular to said plane; and
    the configuration of the platforms and clamp portion being selected so that the pipe is cinched inside the clamp portion when the two flanges are engaged over the first side edge of the strap and the clamp portion engages a second side edge of the strap by angularly displacing the second platform relative to the first platform in the plane of the strap, thereby providing a spring force that pushes the flanges against the first side edge of the strap to hold the clamp and pipe firmly in position.

2. A clamp according to claim 1 wherein the clamp is made of plastic selected from the group consisting of polyethylene, prolypropylene, ABS and PVC.

3. A clamp according to claim 1 wherein the platforms each have a hole therethrough for receiving a fastener.

4. A clamp according to claim 1 wherein the flanges are L-shaped.

5. A clamp according to claim 1 wherein the second platform is longer than the first platform to provide leverage when the clamp is attached to the strap.

6. A clamp according to claim 1 wherein the clamp portion is generally cylindrical.

7. A clamp according to claim 1 wherein the mounting platforms are generally planar.

8. A clamp according to claim 1 wherein the clamp portion includes extensions adjacent the gap which abut one another to prevent over-squeezing of the pipe.

* * * * *